(12) United States Patent
Glinka et al.

(10) Patent No.: US 10,266,057 B2
(45) Date of Patent: Apr. 23, 2019

(54) COMPRESSED-AIR SYSTEM

(71) Applicant: SIEMENS MOBILITY GMBH, Munich (DE)

(72) Inventors: Martin Glinka, Uttenreuth (DE); Matthias Kurz, Erlangen (DE); Alexander Trupp, Winterthur (CH)

(73) Assignee: Siemens Mobility GmbH, Munich (DE)

( * ) Notice: Subject to any disclaimer, the term of this patent is extended or adjusted under 35 U.S.C. 154(b) by 397 days.

(21) Appl. No.: 14/915,789

(22) PCT Filed: Aug. 8, 2014

(86) PCT No.: PCT/EP2014/067115
§ 371 (c)(1),
(2) Date: Mar. 1, 2016

(87) PCT Pub. No.: WO2015/028291
PCT Pub. Date: Mar. 5, 2015

(65) Prior Publication Data
US 2016/0200198 A1    Jul. 14, 2016

(30) Foreign Application Priority Data

Sep. 2, 2013   (DE) .................. 10 2013 217 429

(51) Int. Cl.
*B60L 5/18*   (2006.01)
*B60L 5/32*   (2006.01)

(52) U.S. Cl.
CPC .................. *B60L 5/32* (2013.01); *B60L 5/18* (2013.01); *B60L 2200/26* (2013.01)

(58) Field of Classification Search
CPC ........... B60L 5/18; B60L 5/32; B60L 2200/26
USPC .......................... 60/371, 370, 407, 408, 412
See application file for complete search history.

(56) References Cited

U.S. PATENT DOCUMENTS

| | | |
|---|---|---|
| 4,034,832 A | 7/1977 | Lewis |
| 5,115,405 A | 5/1992 | Cathala et al. |
| 5,116,405 A | 5/1992 | Cathala et al. |
| 7,040,716 B2 * | 5/2006 | Kawaguchi .............. B60L 7/24 137/596.16 |
| 2007/0095834 A1 | 5/2007 | Von Spreckelsen et al. |

FOREIGN PATENT DOCUMENTS

| | | |
|---|---|---|
| AT | 388900 B | 9/1989 |
| CN | 201849328 U | 6/2011 |
| CN | 102431458 A | 5/2012 |
| CN | 202399930 U | 8/2012 |
| CN | 202764722 U | 3/2013 |
| DE | 69010966 T2 | 11/1994 |
| DE | 102008056479 A1 | 5/2010 |
| EP | 0395504 A1 | 10/1990 |

(Continued)

*Primary Examiner* — Logan Kraft
(74) *Attorney, Agent, or Firm* — Laurence A. Greenberg; Werner H. Stemer; Ralph E. Locher (57) ABSTRACT

A compressed air system contains a compressed air reservoir, a compressed air line system and a drive system connected on an inlet side to the compressed air reservoir by way of the compressed air line system. The drive system has a drive and a drive controller, the drive system has a valve provided so as to pneumatically separate the drive controller from the drive.

12 Claims, 4 Drawing Sheets

(56) References Cited

FOREIGN PATENT DOCUMENTS

| | | | |
|---|---|---|---|
| EP | 1862347 | A1 | 12/2007 |
| RU | 122956 | U1 | 12/2012 |
| WO | 2010052084 | A1 | 5/2010 |

* cited by examiner

COMPRESSED-AIR SYSTEM

BACKGROUND OF THE INVENTION

Field of the Invention

The invention relates to a compressed air system having a compressed air reservoir, a compressed air line system and a drive system that is connected on the inlet side to the compressed air reservoir by way of the compressed air system, said drive system having a drive and a drive controller.

Compressed air can be used both as an energy source as well as to control technical processes. Consequently, compressed air systems are used in many technical fields. Compressed air storage power stations, compressed air weapons and pneumatic hammers are examples of systems that use compressed air.

By way of example, brake systems and suspension systems are used in the transport industry, in particular in the case of rail-borne vehicles, omnibuses and trucks, wherein said systems work with compressed air. Specifically in the case of rail-borne vehicles, compressed air is also used for example to drive current collector drives that are provided so as to raise and/or lower current collectors.

It is necessary to regularly supply many compressed air systems with compressed air from outside. Compressed air is often supplied by means of an electrically operated compressor. Compressed air systems can therefore consume a lot of energy.

BRIEF SUMMARY OF THE INVENTION

It is an object of the present invention to provide an energy-saving compressed air system. This object is achieved by means of a compressed air system of the type mentioned in the introduction, wherein in accordance with the invention the drive system comprises a valve that is provided so as to pneumatically separate the drive controller from the drive.

The invention is based on the consideration that in the case of a compressed air system of the type mentioned in the introduction, compressed air can be lost by way of the drive controller, this compressed air loss being attributed to an excess pressure in the drive as a result of influences from outside.

In the case of a rail-borne vehicle having a compressed air system of the type mentioned in the introduction and a current collector, excess pressure can occur periodically in a current collector drive as a result of vibrations in a line that is conducting current, said vibrations being caused by way of example as a result of wind if the current collector is in contact with the line that is conducting current. The periodically occurring excess pressure in the current collector drive can in turn lead to periodic compressed air losses by way of the drive controller.

The invention is further based on the consideration that situations can arise in which the procedure of controlling the drive by means of the drive controller can be at least temporarily omitted. It is thus possible by way of example in the case of a rail-borne vehicle that a procedure of controlling the current collector drive by means of the drive controller can be at least temporarily omitted if the rail-borne vehicle is parked.

It is possible by means of the valve of the drive system to pneumatically separate the drive from the drive controller in periods of time in which it is possible to omit a procedure of controlling the drive by means of the drive controller, whereby it is possible to considerably limit a compressed air loss by way of the drive controller. In this manner, it is less frequently necessary for a compressor to supply compressed air to the compressed air system and consequently energy is saved.

A compressed air reservoir can be a compressed air container that is specifically provided to store compressed air. Advantageously, the compressed air reservoir is in addition provided to supply one or multiple pneumatic elements with compressed air. Expediently, the compressed air reservoir is equipped with an inlet for supplying compressed air, for example by means of a compressor. Furthermore, it is expedient if the compressed air reservoir is equipped with an outlet for supplying pneumatic elements with compressed air.

The term "inlet side of a pneumatic element" can be understood as the side through which the compressed air enters into the pneumatic element. Accordingly, the term "outlet side of a pneumatic element" is to be understood as the side out of which the compressed air exits the pneumatic element. The term "inlet pressure" can be understood as the pressure that prevails at an inlet of the drive and is in particular coupled to a pressure in the interior of the drive or is equal to the pressure in the interior of the drive.

The term "a drive" can be understood as a device that is provided for performing mechanical work with the aid of compressed air, in particular for lifting loads. The drive can be provided so as to assume at least two positions that are in particular dependent upon the inlet pressure. It is advantageous if the drive is provided between the at least two positions in addition to assuming continuous intermediate positions. The positions can be for example stroke positions of a linearly movable drive.

A drive controller can be a device that is provided so as to control operating states of the drive, in particular to control stroke positions of the drive. It is preferred that the drive controller is provided so as to control the operating states of the drive by way of controlling the inlet pressure of the drive. By way of example, an increase in the inlet pressure can lead to a higher stroke position. Conversely, a decrease in the inlet pressure can lead to a lower stroke position. The drive controller can comprise inter alia a pressure control valve.

Furthermore, it is advantageous if the drive controller is provided so as to discharge compressed air. As a consequence, it is possible to reduce the inlet pressure of the drive. It is particularly advantageous if the drive controller is provided so as to control the drive from a first regular operating state into a second regular operating state by means of discharging compressed air. The term a "regular operating state of the drive" can be understood to mean a state, in which the inlet pressure of the drive is below a predetermined value, in particular below a value that is the maximum permissible for safety reasons.

In principle, the valve of the drive system can be manually actuated. However, the valve can also be actuated in an electrical manner, electro-pneumatic manner or in another manner. One advantage of an electro-pneumatically actuated valve is that it renders possible a rapid and comfortable operation.

It is advantageous if the compressed air line system comprises a further valve. It is preferred that the valve is arranged between the drive controller and the compressed air reservoir, in particular directly downstream of the outlet of the compressed air reservoir. Expediently, the valve is provided so as to pneumatically separate the drive controller from the compressed air reservoir. As a consequence, when in the state in which the drive controller is separated pneumatically from the compressed air reservoir, it is not possible for compressed air to be lost from the compressed air reservoir along the entire compressed air line between the compressed air reservoir and the drive controller. As a consequence, compressed air losses from the compressed air reservoir are reduced, such compressed air losses being caused in particular as a result of leakages in a compressed air line between the compressed air reservoir and the drive controller. It is preferred that this valve can be actuated in an electro-pneumatic manner. In a particularly advantageous embodiment of the invention, the drive controller is embodied as a control unit. The control unit can comprise a sensor that is expediently provided so as to measure a control variable of the drive. Furthermore, it is advantageous if the control unit comprises a feedback to an inlet of the control unit.

By way of example, it can then be expedient to embody the drive controller as a control unit if a variable, such as for example the inlet pressure of the drive, can be altered by means of outside influences yet must be automatically maintained as constant or approximately constant.

By way of example, it is necessary for a constant pressure to prevail in a current collector drive of a rail-borne vehicle so that a current collector that is driven by the current collector drive can be pressed with a constant force against a line that is conducting current and it is rendered possible to provide an uninterrupted contact of the current collector to the line that is conducting current.

However, since as mentioned above, the pressure in the current collector drive can be influenced by means of outside influences, such as for example by means of vibrations of the line that is conducting the current, it is advantageous if the drive controller is embodied in the case of a rail-borne vehicle as a control unit.

The term "control variable" can be understood to mean a variable that can be measured and the control unit is provided to control said variable. The control variable is advantageously the inlet pressure of the drive. Expediently the sensor is provided so as to measure the inlet pressure of the drive.

The term a "feedback" can be understood as a mechanism that is provided so as to transmit an in particular electrical signal that is dependent upon the control variable to an inlet of the control unit.

In one advantageous further development of the invention, the drive is embodied as a current collecting drive of a rail-borne vehicle. Expediently, the current collecting drive is provided so as to raise and/or lower a current collector of the rail-borne vehicle, in particular in dependence upon the inlet pressure of said current collector, said inlet pressure being controlled by the drive controller. The current collector drive can be embodied by way of example as an air spring.

In a further advantageous embodiment of the invention, the compressed air line system comprises a bypass, in particular between the compressed air reservoir and the drive. As a consequence, it is possible to bridge the drive controller when in the state in which the drive controller is pneumatically separated from the drive.

The bypass can comprise an auxiliary controller that is advantageously provided so as to control the inlet pressure of the drive. As a consequence, the drive can be influenced with an inlet pressure that can be adjusted, in particular when the drive controller is bridged by means of the bypass.

The auxiliary controller can be embodied as a pressure reducer. One advantage of this embodiment is that practically no compressed air is lost by way of the pressure reducer, in particular in the case of an excess pressure on an output side of the pressure reducer.

Alternatively, the auxiliary controller can be embodied as a further pressure control valve that is advantageously provided so as to discharge compressed air. It is possible in a simple manner by means of this embodiment variant that the inlet pressure of the drive can be reduced as required by way of the auxiliary controller. The auxiliary controller can in particular be embodied as a control unit.

If the auxiliary controller is embodied as a further pressure control valve that is provided so as to discharge compressed air, the auxiliary controller expediently comprises a lower level of control or regulating accuracy than the drive controller. In this manner, it is possible to achieve smaller compressed air losses that occur by way of the auxiliary controller in the case of excess pressure in the drive that is caused by means of influences from outside than would occur by way of the drive controller in the case of an identical excess pressure and identical duration of the excess pressure.

Furthermore, it is advantageous if the valve of the drive system is embodied as a shuttle valve having two inlets and one outlet. As a consequence, the bypass can be connected to the drive without an additional valve. Expediently, the bypass is connected in particular on the outlet side to the drive by way of the shuttle valve. Furthermore, it is advantageous if the bypass is connected in particular on the inlet side to the compressed air reservoir by way of a directional control valve. This renders it possible to embody the compressed air line system in such a manner that the bypass is only supplied with compressed air from the compressed air reservoir as required, for example when in the state in which the drive is pneumatically separated from the drive controller. The directional control valve expediently comprises at least one inlet and at least two outlets. It is preferred that the directional control valve can be actuated in an electro-pneumatic manner.

It is preferred that the outlet of the shuttle valve is connected to the drive by way of the compressed air line system. It is advantageous if one of the two inlets of the shuttle valve is connected to the bypass. Furthermore, it is advantageous if the other of the two inlets of the shuttle valve is connected to the drive controller by way of the compressed air line system. As a consequence, it is possible in a simple manner to switch from providing a compressed air supply to the drive by way of the bypass to providing a compressed air supply to the drive by way of the drive controller.

Expediently, the at least one inlet of the directional control valve is connected to the compressed air reservoir by way of the compressed air system. One of the at least two outlets of the directional control valve is advantageously connected to the bypass. Another of the at least two outlets of the directional control valve is advantageously connected to the drive controller by way of the compressed air line system. As a consequence, either the drive controller or the bypass can be supplied with compressed air from the compressed air reservoir.

If the auxiliary controller is embodied as a pressure reducer, the bypass advantageously comprises a discharge valve that is provided so as to discharge compressed air from the compressed air line system in particular from the bypass. In the case in which the pressure between the pressure reducer and the shuttle valve is higher than the pressure between the drive controller and the shuttle valve, it is possible by means of discharging compressed air by way of the outlet valve for the pressure between the pressure reducer and the shuttle valve to assume a lower value than the pressure between the drive controller and the shuttle valve. As a consequence, in turn the shuttle valve can be switched from providing a compressed air supply to the drive by way of the auxiliary controller to providing a compressed air supply to the drive by way of the drive controller. Advantageously, the discharge valve can be actuated in an electro-pneumatic manner.

In a further variant of the invention, a further compressed air reservoir is connected to the drive by way of the compressed air line system. As a consequence, it can also then remain possible to supply the drive with compressed air if a compressed air supply to the drive by way of the compressed air reservoir is interrupted, for example in the case of the drive controller being pneumatically separated from the drive, said compressed air reservoir being connected to the drive controller.

It is advantageous if the further compressed air reservoir is connected on the outlet side of the drive controller to the drive by way of the compressed air line system. It is particularly advantageous if the further compressed air reservoir is connected on the outlet side of the valve of the drive system to the drive.

It is preferred that the further compressed air reservoir and the drive are connected to the drive controller in a parallel connection by way of the compressed air line system. This renders it possible to provide a compressed air supply to the further compressed air reservoir that is decoupled from a compressed air supply to the drive.

In a further advantageous variant of the invention, the compressed air line system comprises a further valve that in particular can be actuated in an electro-pneumatic manner. Advantageously, this valve is arranged between the further compressed air reservoir and the drive.

Expediently, the valve is provided so as to pneumatically separate the further compressed air reservoir from the drive. As a consequence, a change to a control or regulating dynamic of the drive controller is kept small, said change resulting from connecting the further compressed air reservoir to the drive, in particular in the case of the further compressed air reservoir being pneumatically separated from the drive.

In an advantageous embodiment of the invention, a pressure measuring device is connected to the drive by way of the compressed air line system. Expediently, the pressure measuring device is arranged directly upstream of an inlet of the drive.

Advantageously, the pressure measuring device is provided on a further element so as to transmit an in particular electrical signal that is dependent upon a pressure that is measured with the pressure measuring device. The further element can be by way of example a display element. As a consequence, maintenance and/or operating personnel can monitor the inlet pressure of the drive in a comfortable manner.

In addition, the invention relates to a method for operating a compressed air system having a drive and a drive controller. A compressed air system can be brought into an energy saving state, wherein in accordance with the invention a drive can be pneumatically separated from a drive controller by means of a valve.

In particular, the valve can be actuated in an electro-pneumatic manner.

Furthermore, the invention relates to a method for parking a rail-borne vehicle, wherein the rail-borne vehicle is braked to a standstill in the case of a current-collector being connected to a line that conducts a current.

It is possible to park the rail-borne vehicle in an energy saving manner by virtue of the fact that in accordance with the invention, a current collector drive is pneumatically separated from a drive controller by means of a valve and the current collector of the rail-borne vehicle furthermore remains in contact with the line that is conducting current. Advantageously, the valve can be actuated in an electro-pneumatic manner.

The hitherto provided description of advantageous embodiments of the invention includes numerous features that are summarized in the individual dependent claims and are combined in part to form multiple features. However, these features can also expediently be taken into account individually and combined to form expedient further combinations. In particular, these features can be combined in each case individually and in an arbitrary suitable combination with the device in accordance with the invention and the method in accordance with the invention.

The above described characteristics, features and advantages of this invention and also the manner in which these are achieved become clearer and more easily understandable in connection with the following description of the exemplary embodiments that are further explained in connection with the drawings. The exemplary embodiments are used to explain the invention and do not limit the invention to the combination of features provided therein and also not with regard to functional features. In addition, for this purpose, suitable features of each exemplary embodiment can also be explicitly taken into account in isolation, removed from an exemplary embodiment, introduced to supplement said exemplary embodiment and/or combined with an arbitrary combination of the claims.

DESCRIPTION OF THE INVENTION

Figure 1:
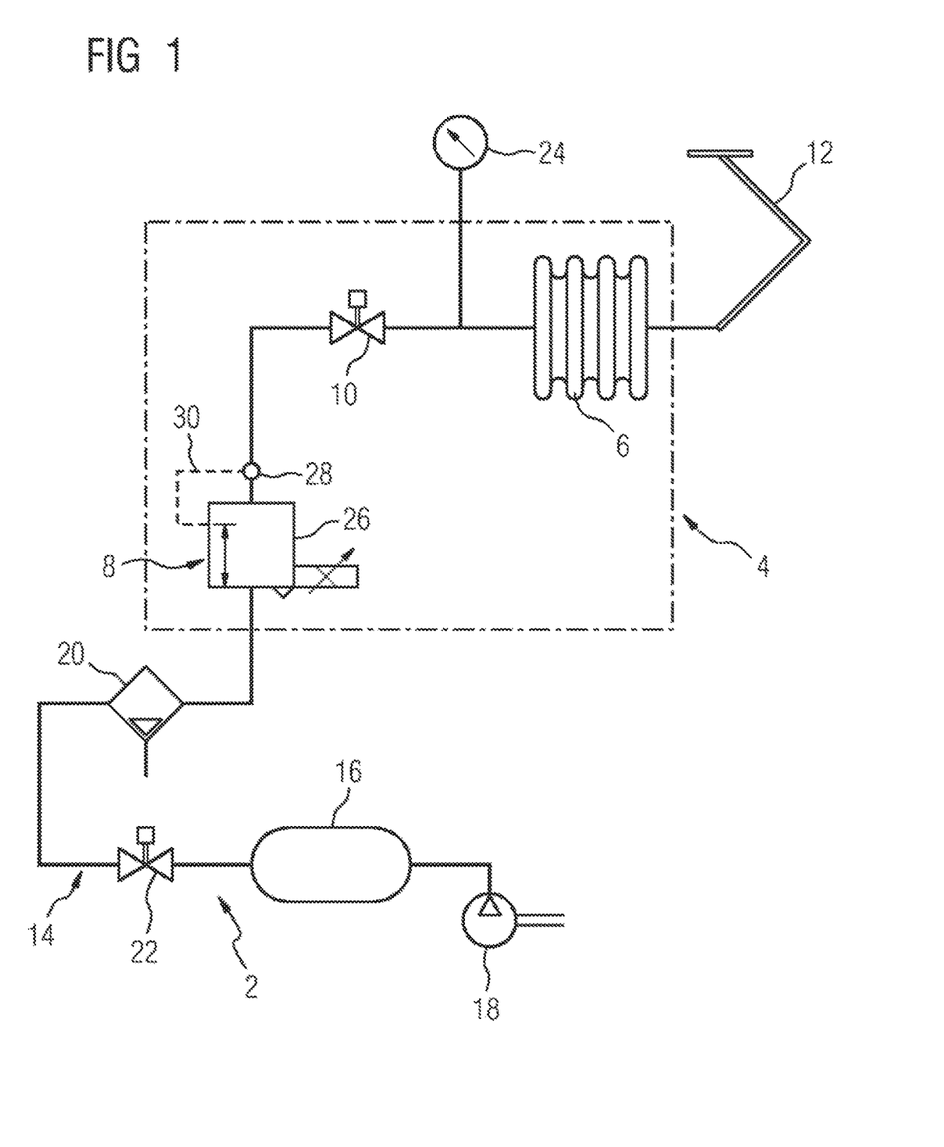
FIG. 1 illustrates a connection diagram of a compressed air system having a drive system that comprises a current collector drive, a drive controller and a valve.

FIG. 1 illustrates a connection diagram of a compressed air system 2 having a drive system 4 that comprises a drive 6 and a drive controller 8. In addition, the drive system 4 comprises a valve 10 that can be actuated in an electro-pneumatic manner, said valve being arranged between the drive 6 and the drive controller 8 and being provided so as to pneumatically separate the drive 6 from the drive controller 8.

The drive 6 is embodied as a current collector drive that is embodied so as to raise and/or to lower a schematically illustrated current collector 12 of a rail-borne vehicle that is not illustrated in FIG. 1.

The current collector is embodied as an air spring that is illustrated schematically in FIG. 1. The air spring is provided so as to assume multiple positions that can be continuously adjusted in dependence upon the inlet pressure.

The drive system 4 is connected on the inlet side to a compressed air reservoir 16 by way of a compressed air line system 14, said compressed air reservoir comprising a volume of 25 l. The compressed air reservoir 16 is in turn connected on the inlet side to a compressor 18 by way of the compressed air line system 14, said compressor being provided so as to supply the compressed air reservoir 16 with compressed air.

The drive controller 8 is connected on the inlet side to an oil/water separator 20 by way of the compressed air line system 14, said water separator being arranged directly upstream of an inlet of the drive controller 8 between the compressed air reservoir 16 and the drive controller 8. The oil/water separator 20 is provided so as to separate oil and/or water from a mixture of oil and/or water and compressed air and also so as to automatically discharge the oil and/or water that is collected.

The compressed air line system 14 comprises a further valve 22 that can be actuated in an electro-pneumatic manner, said valve being arranged directly downstream of an outlet of the compressed air reservoir 16 between the drive controller 8 and the compressed air reservoir 16 and is provided so as to pneumatically separate the drive controller 8 from the compressed air reservoir 16.

A pressure measuring device 24 is connected to the drive 6 by way of the compressed air line system 14, wherein the pressure measuring device 24 is arranged directly upstream of an inlet of the drive 6. The pressure measuring device 24 is provided on a display element, not illustrated in FIG. 1, so as to transmit an electrical signal that is dependent upon a pressure that is measured with the pressure measuring device 24.

The drive controller 8 is provided so as to control operating states of the drive 6 by way of controlling an inlet pressure of the drive 6. In particular, the drive controller 8 is provided so as to control the drive 6 from a first regular operating state into a second regular operating state by means of discharging compressed air. In addition, the drive controller 8 is embodied as a control unit that comprises a pressure control valve 26, a sensor 28 and a feedback 30 to an inlet of the control unit.

The sensor 28 of the control unit is provided so as to measure the inlet pressure of the drive 6. Furthermore, the pressure control valve 26 is provided so as to render possible an infinitely variable electrical adjustment of the inlet pressure of the drive 6.

In the case of a rail-borne vehicle that is traveling, said vehicle having a compressed air system 2 of the type that is illustrated in FIG. 1, the valve 10 of the drive system 4 and also the valve 22 are located between the compressed air reservoir 16 and the drive controller 8 in each case in a position in which compressed air can flow from a compressed air reservoir 16 to the drive 6 by way of the drive controller 8.

When the rail-borne vehicle is traveling, the current collector 12 of the rail-borne vehicle is in contact with a line that is conducting current. In addition, a procedure of controlling the inlet pressure of the drive 6 is performed by means of the controller 8. In dependence upon external influences that produce an increase or decrease in pressure in the drive 6, compressed air is discharged or further compressed air is supplied to the drive 6 by way of the drive control 8. As a consequence, it is ensured that a constant pressure prevails in the drive 6 and said pressure can be adjusted by way of the drive controller 12. As a consequence, the current collector 8 is pressed with a constant force against a line that conducts current.

In order to park the rail-borne vehicle, the rail-borne vehicle is braked until coming to a standstill. The valve 10 of the drive system 4 is subsequently brought into a position in which said valve pneumatically separates the drive 6 from the drive controller 8. The current collector 12 remains in contact with the line that conducts current.

By virtue of pneumatically separating the drive 6 from the drive controller 8, compressed air loss by way of the drive controller that is attributed to an excess pressure in the drive as a result of influences from outside is avoided. As a consequence, a high pressure can be maintained over a relatively long period of time in the drive 6 without additionally supplying compressed air to the drive 6. Consequently, the current collector 12 can remain in contact over a relatively long period of time with the line that conducts current without additionally supplying compressed air to the drive.

If in addition with the aid of the valve 22 that is arranged between the drive controller 8 and the compressed air reservoir 16, the drive controller 8 is pneumatically separated from the compressed air reservoir 16, compressed air losses from the compressed air reservoir 16 are reduced, said compressed air losses being caused as a result of leakages in a compressed air line between the compressed air reservoir 16 and the drive controller 8.

After the rail-borne vehicle has stood still for a long time, the pressure in the drive 6 falls, for example as a result of leakages, to a value at which an uninterrupted contact of the current collector 12 to the line that conducts current is no longer provided. With the aid of the pressure measuring device 24, it is possible for maintenance personnel and/or operating personnel to monitor in regular intervals whether this is the case.

In order to increase the pressure again in the drive 6 to the extent that an uninterrupted contact of the current collector 12 to the line that conducts current is provided again, the valve 10 of the drive system 4 and also the valve 22 between the compressed air reservoir 16 and the drive controller 8 is brought afresh into a position in which compressed air can flow from the compressed air reservoir 16 to the drive 6 by way of the drive controller 8.

This action can be performed by the maintenance personnel and/or operating personnel. Alternatively, the pressure measuring device 24 can be provided so as to transmit an electrical signal that is dependent upon the inlet pressure of the drive 6 to the valve 10 that can be actuated in an electro-pneumatic manner and is part of the drive system 4, and also to the valve 22 between the compressed air reservoir 16 and the drive controller 8. The two valves can be embodied in such a manner that they are provided so as to perform an actuation by means of the electrical signal from the pressure measuring device 24. As a consequence, an automatic actuation of the two valves can occur without the intervention of the maintenance personnel and/or operating personnel. Expediently, the two valves are brought into a position in which compressed air can flow from the compressed air reservoir 16 to the drive 6 by way of the drive controller 8 as soon as the pressure that is measured by the pressure measuring device 24 lies below a predetermined value.

If so much compressed air flows to the drive 6 that the inlet pressure of the drive 6 is increased again to such an extent that an uninterrupted contact of the current collector 12 to the line that is conducting current is produced again, the valve 10 of the drive system 4 is brought afresh into a position in which said valve pneumatically separates the drive 6 from the drive controller 8. Accordingly, the valve 22 can also be brought afresh into a position between the compressed air reservoir 16 and the drive controller 8 and in said position said valve pneumatically separates the drive controller 8 from the compressed air reservoir 16.

These actions can also be performed by maintenance personnel and/or operating personnel. Alternatively, the two valves can be automatically brought into the corresponding positions by means of the electrical signal from the pressure measuring device 24 as soon as the pressure that is measured by the pressure measuring device 24 exceeds a predetermined value.

Figure 2:
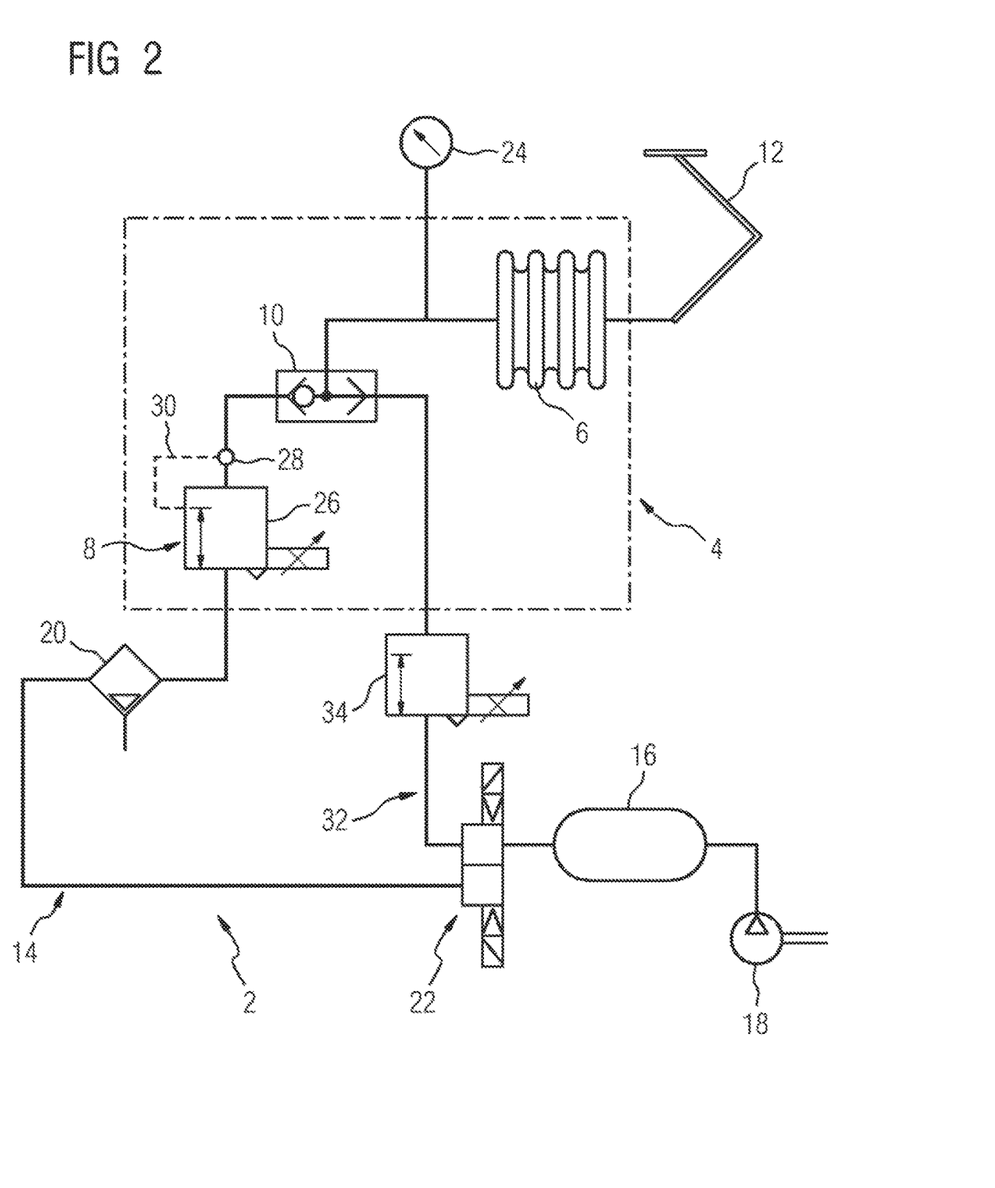
FIG. 2 illustrates a connection diagram of a first compressed air system having a bypass between a compressed air reservoir and a current collector drive.

FIG. 2 illustrates a connection diagram of a compressed air system 2 that is a further development of the compressed air system 2 that is illustrated in FIG. 1.

The description hereinunder limits itself in each case essentially to the differences with regard to the preceding exemplary embodiments, to which reference is made with regard to features and functions that remain identical. Components that remain essentially identical are fundamentally provided with the identical reference numeral and features that are not mentioned are assumed in the exemplary embodiments hereinunder without the need to repeat a description.

The compressed air system 2 differs from the compressed air system 2 that is illustrated in FIG. 1 by virtue of the fact that the compressed air system 2 that is illustrated in FIG. 2 comprises a bypass 32 that is provided so as to bridge the drive controller 8 in the state in which the drive controller 8 is pneumatically separated from the drive 6.

So that the drive 6 can be influenced with an adjustable inlet pressure with the aid of the bypass 32 when bridging the drive controller 8, the bypass 32 comprises an auxiliary controller 34 that is provided so as to control the inlet pressure of the drive 6. The auxiliary controller 34 is embodied as a further pressure control valve that is provided so as to discharge compressed air and also so as to provide an infinitely variable, electrical adjustment of the inlet pressure of the drive 6.

So that fewer compressed air losses occur in the case of excess pressure in the drive 6 when in the state in which the drive 6 is pneumatically separated from the drive controller 8 by way of the auxiliary controller 34 than would occur by way of the drive controller 8 in the case of the identical excess pressure and identical duration of the excess pressure, the accuracy of the control by the auxiliary controller 34 is less than that of the drive controller 8.

In addition, the compressed air system 2 differs from the compressed air system that is illustrated in FIG. 1 by virtue of the fact that in the case of the compressed air system 2 that is illustrated in FIG. 2 the valve 10 of the drive system 4 is embodied as a pneumatically operated shuttle valve having two inlets, an outlet and a ball as a shut-off body. The shuttle valve is provided so as to pneumatically separate the drive 6 from the drive controller 8.

Furthermore, the compressed air system 2 differs from the compressed air system 2 that is illustrated in FIG. 1 by virtue of the fact that, in the case of the compressed air system 2 that is illustrated in FIG. 2, the valve 22 is embodied between the compressed air reservoir 16 and the drive controller 8 as a directional control valve having an inlet and two outlets and said directional control valve can be actuated in an electro-pneumatic manner.

The bypass 32 is connected on the outlet side to the drive 6 by way of the shuttle valve and on the inlet side to the compressed air reservoir 16 by way of the directional control valve.

The outlet of the shuttle valve is connected to the drive 6 by way of the compressed air line system 14. One of the two inlets of the shuttle valve is connected to the bypass 32 while the other of the two inlets of the shuttle valve is connected to the drive controller 8 by way of the compressed air line system 14. The inlet of the directional control valve is connected by way of the compressed air line system 14 to the compressed air reservoir 16. One of the two outlets of the directional control valve is connected to the bypass 32 while the other of the two outlets of the directional control valve is connected to the drive controller 8 by way of the compressed air line system 14.

In order to pneumatically separate the drive 6 from the drive controller 8, the directional control valve is brought into a position in which compressed air can flow from the compressed air reservoir 16 to the auxiliary controller 34 and in which so much compressed air can be discharged by way of the drive controller 8 that a higher pressure prevails between the auxiliary controller 34 and the shuttle valve than between the drive controller 8 and the shuttle valve. As a consequence, the shuttle valve is switched from providing a compressed air supply to the drive 6 by way of the drive controller 8 to providing a compressed air supply to the drive 6 by way of the auxiliary controller 34.

Furthermore, it is possible to supply the drive 6 with compressed air by way of the compressed air reservoir 16 when in the state in which the drive 6 is pneumatically separated from the drive controller 8, wherein owing to the control of said drive controller being less accurate, smaller compressed air losses occur by way of the auxiliary controller 34 in the case of excess pressure in the drive 6 than would occur in the identical conditions by way of the drive controller 8. This renders it possible to further extend the period of time over which a high pressure can be maintained in the drive 6 with respect to the case in which only the drive 6 is pneumatically separated from the drive controller 8. Furthermore, it simultaneously remains possible to control the drive 6.

In order to switch into a normal control operation in which the inlet pressure of the drive 6 is controlled by way of the drive controller 8 that is embodied as a control unit, the directional control valve is brought into a position in which compressed air can flow from the compressed air reservoir 16 to the drive controller 8. The pressure between the auxiliary controller 34 and the shuttle valve is then decreased, by means of discharging compressed air by way of the auxiliary controller 34, to such an extent that the pressure assumes a lower value than the pressure between the drive controller 8 and the shuttle valve. As a consequence, the shuttle valve is switched from providing a compressed air supply to the drive 6 by way of the auxiliary controller 34 to providing a compressed air supply to the drive 6 by way of the drive controller 8.

Figure 3:
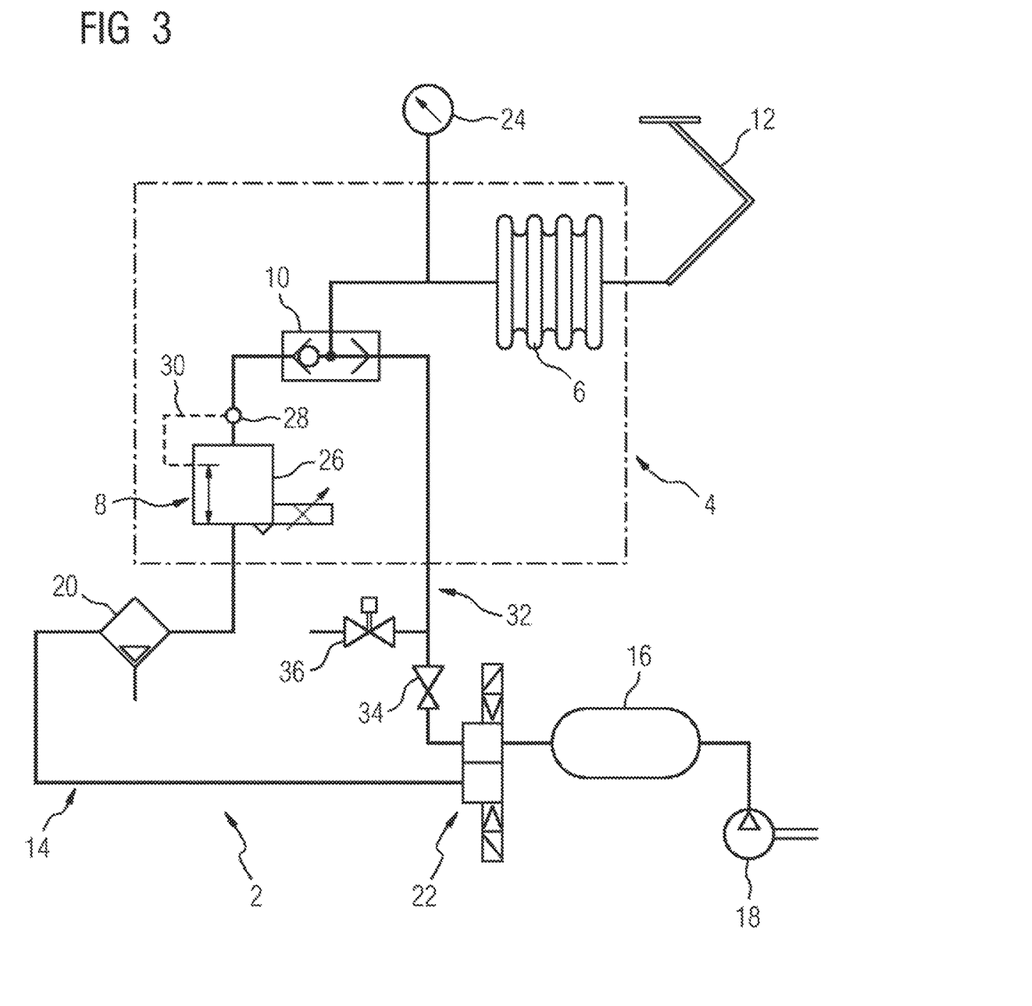
FIG. 3 illustrates a connection diagram of a second compressed air system having a bypass between a compressed air reservoir and a current collector drive and FIG. 4 illustrates a connection diagram of an alternative compressed air system having a compressed air reservoir and a further compressed air reservoir.

FIG. 3 illustrates a connection diagram of a further compressed air system 2 that is a further development of the compressed air system 2 that is illustrated in FIG. 1.

The compressed air system 2 differs from the compressed air system 2 that is illustrated in FIG. 2 by virtue of the fact that in the case of the compressed air system 2 that is illustrated in FIG. 3, the auxiliary controller 34 is embodied as a pressure reducer. In addition, the bypass 32 comprises a discharge valve 36 that is provided so as to discharge compressed air from the bypass 32 and can be actuated in an electro-pneumatic manner.

In order to pneumatically separate the drive 6 from the drive controller 8, a procedure is performed as in the compressed air system 2 that is illustrated in FIG. 2. Furthermore, the drive 6 can be supplied with compressed air by way of the compressed air reservoir 16 when in the state of pneumatic separation, wherein practically no compressed air is lost in the case of excess pressure in the drive 6 by way of the auxiliary controller 34 that is embodied as a pressure reducer. This renders it possible to further extend the period of time over which a high pressure can be maintained in the drive 6, with respect to the case in which only the drive 6 is pneumatically separated from the drive controller 8.

In order to switch into a normal control operation in which the inlet pressure of the drive 6 is controlled by way of the drive controller 8 that is embodied as a control unit, the directional control valve is brought into a position in which compressed air can flow from the compressed air reservoir 16 to the drive controller 8. The pressure between the auxiliary controller 34 and the shuttle valve is then reduced by means of discharging compressed air by means of the discharge valve 36 to such an extent that the pressure assumes a lower value than the pressure between the drive controller 8 and the shuttle valve. As a consequence, the shuttle valve is switched from providing a compressed air supply to the drive 6 by way of the auxiliary controller 34 to providing a compressed air supply to the drive 6 by way of the drive controller 8.

Figure 4:
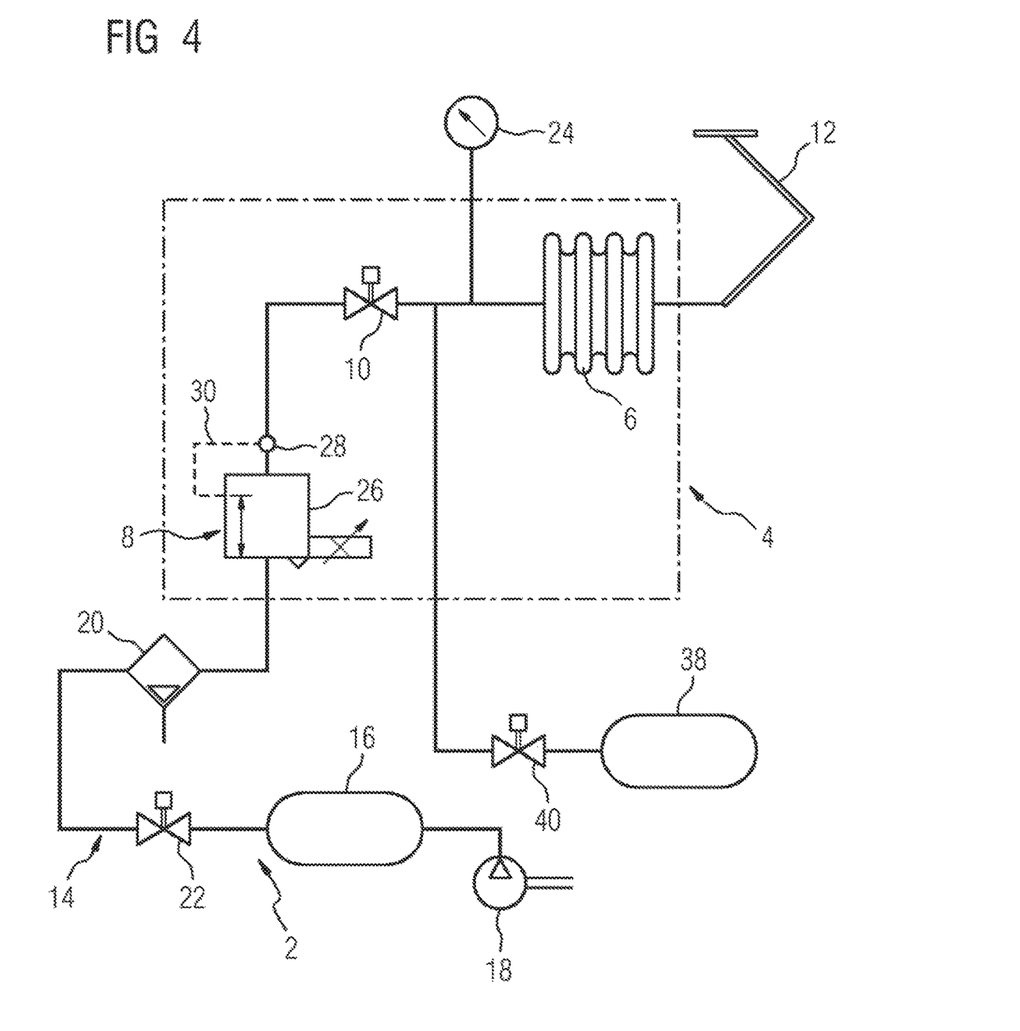

FIG. 4 illustrates a connection diagram of an alternative compressed air system 2 that is a further development of the compressed air system 2 that is illustrated in FIG. 1. The compressed air system 2 differs from the compressed air system 2 that is illustrated in FIG. 1 by virtue of the fact that in the case of the compressed air system 2 that is illustrated in FIG. 4, a further compressed air reservoir 38 is connected to the drive 6 by way of the compressed air line system 14.

The further compressed air reservoir 38 is connected to the drive 6 by way of the compressed air line system 14 so as to supply said drive with compressed air when in the state in which the drive controller 8 is pneumatically separated from the drive 6. The further compressed air reservoir 38 comprises a volume of 10 l.

In addition, the further compressed air reservoir 38 is connected to the drive 6 by way of the compressed air line system 14 on the outlet side of the valve 10 of the drive system 4. The further compressed air reservoir 38 and the drive 6 are connected in a parallel connection to the drive controller 8 by way of the compressed air line system 14.

In addition, the compressed air line system 14 comprises a further valve 40 that can be actuated in an electro-pneumatic manner. This valve 40 is arranged between the further compressed air reservoir 38 and the drive 6. The valve is provided so as to pneumatically separate the further compressed air reservoir 38 from the drive 6.

In order to fill the further compressed air reservoir 38, both the valve 10 of the drive system 4 as well as the valve 40 between the further compressed air reservoir 38 and the drive 6 are brought into a position in which compressed air can flow from the compressed air reservoir 16 to the further compressed air reservoir 38.

If the valve 10 of the drive system 4 is brought into a position in which said valve pneumatically separates the drive 6 from the drive controller 8, the drive 6 can be supplied with compressed air by way of the further compressed air reservoir 38. For this purpose, the valve 40 between the further compressed air reservoir 38 and the drive 6 is brought into a position in which compressed air can flow from the further compressed air reservoir 38 to the drive 6. As a consequence, it is possible to further extend the period of time over which it is possible to maintain a high pressure in the drive 6 in contrast to the case in which only the drive 6 is pneumatically separated from the drive controller 8.

In the normal control operation in which the inlet pressure of the drive 6 is controlled by way of the drive controller 8 that is embodied as a control unit, the valve 40 between the further compressed air reservoir 38 and the drive 6 is brought into a position in which the further compressed air reservoir 38 is pneumatically separated from the drive 6. As a consequence, it is possible for a change to a control dynamic of the drive controller 8 to be kept small, said change resulting from a connection of the further compressed air reservoir 38 to the drive 6.

Although the invention has been further illustrated and described in detail by means of the preferred exemplary embodiments, the invention is not thus limited by means of the disclosed examples and other variations can be derived therefrom by the person skilled in the art without departing the protective scope of the invention.

The invention claimed is:

1. A compressed air system, comprising:
   a compressed air reservoir;
   a compressed air line system;
   a drive system having an inlet side connected to said compressed air reservoir by way of said compressed air line system, said drive system having a drive and a drive controller, said drive system having a valve provided so as to pneumatically separate said drive controller from said drive; and
   a further compressed air reservoir connected to said drive by way of said compressed air line system so as to supply said drive with compressed air, when in a state in which said drive controller is pneumatically separated from said drive, said further compressed air reservoir being connected to said drive by way of said compressed air line system on an outlet side of said valve of said drive system.

2. The compressed air system according to claim 1, wherein said drive controller is a control unit having a sensor for measuring a control variable of said drive, and also a feedback connected to an inlet of said control unit.

3. The compressed air system according to claim 1, wherein said drive is a current collector drive of a rail-borne vehicle, said drive being provided to raise and/or lower a current collector of the rail-borne vehicle in dependence upon an inlet pressure of said drive, said inlet pressure being controlled by said drive controller.

4. The compressed air system according to claim 1, further comprising a bypass connected between said compressed air reservoir and said drive and is provided to bridge said drive controller when in a state in which said drive controller is pneumatically separated from said drive.

5. The compressed air system according to claim 4, wherein said bypass has an auxiliary controller for controlling an inlet pressure of said drive.

6. The compressed air system according to claim 5, wherein said auxiliary controller is a pressure reducer.

7. The compressed air system according to claim 4, wherein:
   said valve of said drive system is a shuttle valve having two inlets and one outlet; and said bypass having a directional control valve with one inlet and two outlets, said bypass having an outlet side connected to said drive by way of said shuttle valve and an inlet side connected to said compressed air reservoir by way of said directional control valve.

8. The compressed air system according to claim 1, wherein said further compressed air reservoir is connected to said drive by way of said compressed air line system on an outlet side of said drive controller.

9. The compressed air system according to claim 1, wherein said further compressed air reservoir and said drive are connected in a parallel connection to said drive controller by way of said compressed air line system.

10. The compressed air system according to claim 1, wherein said compressed air line system contains a further valve disposed between said further compressed air reservoir and said drive, said further valve pneumatically separating said further compressed air reservoir from said drive.

11. The compressed air system according to claim 1, further comprising a pressure measuring device connected to said drive by way of said compressed air line system, said pressure measuring device is disposed directly upstream of an inlet of said drive.

12. A method for parking a rail-borne vehicle, the method comprising:
- braking the rail-borne vehicle to a standstill while a current collector thereof is connected to a line that conducts current;
- pneumatically separating a current collector drive from a drive controller by means of a valve and maintaining the current collector of the rail-borne vehicle in contact with the line that conducts current;
- wherein the current collector drive is connected with a compressed air reservoir by way of a compressed air line system on an outlet side of the valve of the drive system so as to supply the drive with compressed air when the drive controller is pneumatically separated from the drive.

* * * * *